Patented Oct. 11, 1949

2,484,500

UNITED STATES PATENT OFFICE 2,484,500

PREPARATION OF PROPIONIC ACIDS BY REDUCTION OF BETA PROPIONO LACTONES

Hugh J. Hagemeyer, Jr., Kingsport, Tenn., assignor to Eastman Kodak Company, Rochester, N. Y., a corporation of New Jersey No Drawing. Application October 28, 1947, Serial No. 782,673

13 Claims. (Cl. 260—514)

1

This invention relates to the reduction of beta-lactones and more specifically to the reduction of beta-lactones of beta hydroxy acids wherein the hydroxyl groups are primary alcohol groups. The invention is particularly concerned with the reduction of beta propionio lactone to form propionic acid.

Beta lactones can be hydrogenated in the presence of a hydrogenation catalyst, such as Raney nickel catalyst, to form the corresponding organic carboxylic acids. In its broadest aspects the hydrogenation of beta-lactones provides a method for converting the beta-lactone group to a carboxyl group in accordance with the equation:

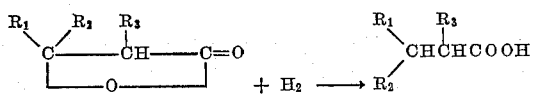

wherein $R_1$, $R_2$ and $R_3$ each represent a hydrogen atom, an alkyl group, e. g. methyl or ethyl, an aryl group, e. g., phenyl, etc.

The beta propiono lactones (when $R_1$ and $R_2$ in the above general formula are hydrogen atom) possess a high degree of reactivity which differentiates them from the beta substituted beta-lactones (when $R_1$ and/or $R_2$ is methyl, ethyl, phenyl, etc.)

Under normal hydrogenation conditions the beta substituted beta lactones are readily reduced to the corresponding organic carboxylic acid, e. g., beta butyro lactone is hydrogenated to form butyric acid in high yield by reduction at 130–160° C. and 300–500 p. s. i.

However, in the case of beta propiono lactone, the application of heat in the presence or absence of a catalyst polymerizes this lactone to the linear polyester of hydracrylic acid as can be represented by the following formula:

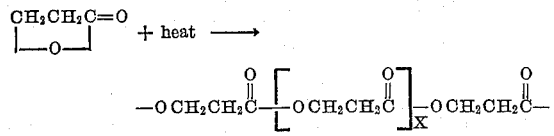

Raney nickel will catalyze this polymerization; rather than promote the reduction of the propiono lactone, under normal hydrogenation conditions.

An object, therefore, of my invention is a process for producing high yields of propionic acids by the catalytic reduction of beta propiono lactones. Other objects will appear hereinafter.

In accordance with my invention I have dis-

2 covered that the reduction of beta propiono lactones can be accomplished without substantial polymerization occurring by carrying out the reduction with Raney nickel in the presence of water or copper, or with both water and copper being present. The amount of water, preferably distilled water, is not critical although the rate of hydrogenation increases with the amount of water added up to equimolar proportions. The presence of water serves both as a reaction promoter and as an inhibitor to the linear polymerization of beta lactones. The presence of soluble copper salts, or conducting the reaction in copper lined equipment, act as reaction promoters and inhibitors of vinyl type polymerizations. Because beta lactones undergo both linear and vinyl types of polymerization simultaneously the preferred conditions of reaction exist when both copper and water are present in accordance with my invention. If the reduction is carried out in a steel autoclave, the copper, if such is used, may be added with the lactone in the form of soluble copper salts such as copper carbonate, copper acetate, or copper acrylate or one or more copper salts of aliphatic carboxylic acids. However, addition of copper salts may be dispensed with if the reduction is conducted in a copper lined autoclave. In the absence of both copper in the stated condition, or water, the yield of acid from beta lactones containing two replaceable hydrogens in the beta position is negligible.

The starting materials employed in the process of the invention are beta lactones having the structure

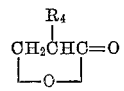

wherein $R_4$ represents a hydrogen atom, an alkyl group, e. g. methyl, ethyl, n-propyl, n-butyl, isobutyl; an aralkyl group, e. g. benzyl or beta-phenylethyl; an aryl group, e. g. phenyl, m-tolyl or p-tolyl. These beta lactones may be prepared by condensing formaldehyde with aldol ketenes in the presence of a suitable catalyst such as $BF_3$ etherate, $ZnCl_2$, $HgCl_2$ $Zn(CNS)_2$, boric acid and triacetyl borate. The particular lactone is then reduced with Raney nickel catalyst in the presence of copper and/or water. The amount of water preferred is between 0.1 to 1.0 mole of water per mole of lactone. Higher or lower concentrations of water may be employed although there appears no advantage therein. Above 10 atmospheres are desirable pressures to employ in the autoclave and the preferred temperature range is 130-180° C.

The invention is further illustrated in the following examples:

Example 1

200 grams of beta propiono lactone and 5 grams of Raney nickel catalyst washed with distilled water were placed in a copper lined stirrer type autoclave. The reduction was carried out at 160° and 650-700 p. s. i. The solution was decanted to separate the catalyst and distilled. Distillation gave 185 grams of propionic acid with zero unsaturation.

Example 2

200 grams of beta propiono lactone and 50 grams of distilled water together with two grams of Raney nickel catalyst were placed in a stainless steel stirrer type autoclave. The reduction started at 100° C. and 300 p. s. i. The temperature was raised to 160° C. and the pressure increased to 500 p. s. i. at which point the reduction was very rapid and complete in one hour. Distillation gave 65 grams of propionic acid-water azeotrope and 160 grams of propionic acid. Zero percent unsaturation.

Example 3

200 grams of beta propiono lactone and 25 grams of water were treated as in Example 2. Distillation gave 37 grams of propionic acid-water azeotrope, 139 grams of propionic acid and 27 grams residue.

Example 4

200 grams of beta propiono lactone and 12 grams of water were treated as in Example 2. Distillation gave 27 grams of the water azeotrope, 104 grams of propionic acid and 64 grams of residue.

Example 5

300 grams of beta propiono lactone and 5 grams of Raney nickel washed with water were placed in a copper lined autoclave. The initial reduction began at 130° C. and the pressure was maintained between 300-500 p. s. i. Distillation gave 285 grams of propionic acid.

Example 6

172 grams of alpha methyl beta propiono lactone and about 2 grams of Raney nickel were placed in a copper lined autoclave. The initial reduction began at 130° C. and the pressure was maintained between 500-800 p. s. i. Distillation gave 165 grams of iso-butyric acid.

Example 7

200 grams of alpha ethyl beta propiono lactone and 2 grams of Raney nickel were placed in a copper lined autoclave. The initial reduction began at 120° C. and the pressure was maintained between 500-800 p. s. i. Distillation gave 191 grams of alpha methyl butyric acid.

Example 8

200 grams of beta propiono lactone and 0.5 gram of copper acetate together with two grams of Raney nickel catalyst were placed in a stainless steel stirrer type autoclave. The reduction started at 110° C. and 300 p. s. i. The temperature was raised to 160° C. and the pressure increased to 500 p. s. i. at which point the reduction was very rapid and complete in one hour. Distillation gave 65 grams of propionic acid-water azeotrope and 160 grams of propionic acid. Zero percent unsaturation.

Example 9

200 grams of beta propiono lactone and 0.5 gram of copper carbonate together with two grams of Raney nickel catalyst were placed in a stainless steel stirrer type autoclave. The reduction started at 110° C. and 300 p. s. i. The temperature was raised to 160° C. and the pressure increased to 500 p. s. i. at which point the reduction was very rapid and complete in one hour. Distillation gave 65 grams of propionic acid-water azeotrope and 160 grams of propionic acid. Zero percent unsaturation.

I claim:

1. The process for the production of organic carboxylic acids by the catalytic hydrogenation in the presence of a metallic hydrogenation catalyst and in the presence of copper and water in an amount being only such as to function as a polymerization inhibitor, of beta propiono lactones of the general formula:

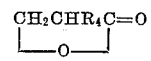

wherein $R_4$ represents a member selected from the class consisting of a hydrogen atom, and the groups: methyl, ethyl, n-propyl, n-butyl, iso butyl, benzyl, $\beta$-phenylethyl, phenyl, m-tolyl and p-tolyl.

2. The process for the production of organic carboxylic acids by the catalytic hydrogenation in the presence of a nickel hydrogenation catalyst and in the presence of copper polymerization inhibitor of beta propiono lactones of the general formula:

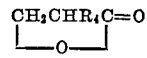

wherein $R_4$ represents a member selected from the class consisting of a hydrogen atom, and the groups: methyl, ethyl, n-propyl, n-butyl, iso butyl, benzyl, $\beta$-phenylethyl, phenyl, m-tolyl and p-tolyl.

3. The process for the production of organic carboxylic acids by the catalytic hydrogenation in the presence of a metallic hydrogenation catalyst and in the presence of water in an amount between 0.1 to 1.0 mole of water per mole of lactone, of beta propiono lactones of the general formula:

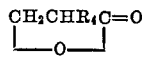

wherein $R_4$ represents a member selected from the class consisting of a hydrogen atom, and the groups: methyl, ethyl, n-propyl, n-butyl, iso butyl, benzyl, $\beta$-phenylethyl, phenyl, m-tolyl and p-tolyl.

4. The process for the production of propionic acid which comprises hydrogenating by the aid of a metallic hydrogenation catalyst, in the presence of water and copper, beta propiono lactone the amount of water being only such as to function as a polymerization inhibitor.

5. The process for the production of propionic acid which comprises hydrogenating by the aid of a metallic hydrogenation catalyst, in the presence of copper as a polymerization inhibitor, beta propiono lactone.

6. The process for the production of propionic acid which comprises hydrogenating by the aid of a metallic hydrogenation catalyst, in the presence of water the amount of water being only such as to function as a polymerization inhibitor, beta propiono lactone.

7. The process for the production of propionic acid which comprises catalytically hydrogenating beta propiono lactone in the presence of a metallic hydrogenation catalyst and in a copper lined autoclave at a temperature of 160° C. and at a pressure of 650-700 pounds per square inch.

8. The process for the production of propionic acid which comprises hydrogenating beta propiono lactone in a copper lined autoclave in the presence of a metallic hydrogenation catalyst which has been wet with water.

9. The process for the production of iso-butyric acid which comprises hydrogenating alpha methyl beta propiono lactone in a copper lined autoclave in the presence of a metallic hydrogenation catalyst.

10. The process for the production of alpha methyl butyric acid which comprises hydrogenating alpha ethyl beta propiono lactone in a copper lined autoclave in the presence of a metallic hydrogenation catalyst.

11. The process for the production of propionic acid which comprises hydrogenating beta propiono lactone in a copper lined autoclave in the presence of a metallic hydrogenation catalyst and water in an amount between 0.1 to 1.0 mole of water per mole of lactone, the initial hydrogenation being conducted at 110° C. and 300 pounds per square inch and the subsequent hydrogenation being conducted at 160° C. and 500 pounds per square inch.

12. The process for the production of propionic acid which comprises hydrogenating beta propiono lactone in the presence of copper salts of aliphatic carboxylic acids and a metallic hydrogenation catalyst.

13. The process for the production of propionic acid which comprises hydrogenating beta propiono lactone in the presence of copper carbonate and a metallic hydrogenation catalyst.

HUGH J. HAGEMEYER, JR.

REFERENCES CITED

The following references are of record in the file of this patent:

Adkins et al., J. Am. Chem. Soc., vol. 54, pp. 1145-1153 (1932).

Johansson, Beilstein's Handbuch der Org. Chemie, vol. 17 (Suppl.), 4th edition, page 130 (1934).

Allen et al., J. Am. Chem. Soc., vol. 61, pp. 843-846 (1939).

Boese, Ind. & Eng. Chem., vol. 32, pp. 16-22 (1940).

Adkins, "Reactions of Hydrogen" (U. of Wis. 1946), pp. 76-78.